US011405091B2

(12) United States Patent
Rune et al.

(10) Patent No.: US 11,405,091 B2
(45) Date of Patent: Aug. 2, 2022

(54) ENERGY EFFICIENT CAMPING WITH OPTIMAL BEAM FINDING BEFORE ACCESS

(71) Applicant: TELEFONAKTIEBOLAGET LM ERICSSON (PUBL), Stockholm (SE)

(72) Inventors: Johan Rune, Lidingö (SE); Icaro L. J. Da Silva, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 144 days.

(21) Appl. No.: 16/625,372

(22) PCT Filed: Aug. 14, 2018

(86) PCT No.: PCT/IB2018/056109
§ 371 (c)(1),
(2) Date: Dec. 20, 2019

(87) PCT Pub. No.: WO2019/034996
PCT Pub. Date: Feb. 21, 2019

(65) Prior Publication Data
US 2021/0336686 A1 Oct. 28, 2021

Related U.S. Application Data

(60) Provisional application No. 62/546,082, filed on Aug. 16, 2017.

(51) Int. Cl.
*H04W 24/10* (2009.01)
*H04B 7/08* (2006.01)
(Continued)

(52) U.S. Cl.
CPC ............ *H04B 7/088* (2013.01); *H04W 24/10* (2013.01); *H04W 48/20* (2013.01); *H04W 56/001* (2013.01)

(58) Field of Classification Search
CPC ...... H04B 7/04; H04B 7/0617; H04B 7/0695; H04B 7/088; Y02D 30/70
See application file for complete search history.

(56) References Cited

U.S. PATENT DOCUMENTS 10,512,008 B2 * 12/2019 Deenoo ............... H04W 8/22
11,088,747 B2 * 8/2021 Islam ............... H04W 72/042
(Continued)

FOREIGN PATENT DOCUMENTS

KR  20140054413 A  5/2014
WO  2015/080648 A1  6/2015

OTHER PUBLICATIONS

Catt, NR cell for idle state, R2-166125, 3GPP TSG-RAN WG2 Meeting, #95bis Kaohsiung, Oct. 10-14, 2016, 6 pages.
(Continued)

*Primary Examiner* — Jean A Gelin

(57) ABSTRACT

The disclosure relates to a method, and User Equipment, UE, for energy efficient beam selection and re-selection for camping on a cell and for accessing the cell. The method comprises performing partial intra-cell beam measurements; selecting a beam for camping on the cell based on the partial intra-cell beam measurements; detecting a need to access the cell; and upon determining not to perform additional intra-cell beam measurements for assessment of potential beam reselection, accessing the cell using the beam selected for camping on the cell; or upon determining to perform additional intra-cell beam measurements for assessment of potential beam re-selection, performing additional intra-cell beam measurements, selecting a beam for accessing the cell based on the additional intra-cell beam measurements, and accessing the cell using the beam selected for accessing the cell.

10 Claims, 11 Drawing Sheets

(51) Int. Cl.
*H04W 48/20* (2009.01)
*H04W 56/00* (2009.01)

(56) References Cited

U.S. PATENT DOCUMENTS

| | | |
|---|---|---|
| 2005/0176469 A1 | 8/2005 | Stern-Berkowitz et al. |
| 2005/0239464 A1 | 10/2005 | Iacono |
| 2005/0282542 A1* | 12/2005 | Karabinis ............. H04B 7/216 455/429 |
| 2010/0054196 A1* | 3/2010 | Hui ...................... H04W 16/00 370/329 |
| 2012/0052828 A1 | 3/2012 | Kamel |
| 2014/0235246 A1 | 8/2014 | Lin |
| 2014/0323144 A1 | 10/2014 | Kim |
| 2015/0078189 A1 | 3/2015 | Kwon |
| 2015/0257073 A1 | 9/2015 | Park |
| 2015/0304868 A1 | 10/2015 | Yu |
| 2016/0150435 A1 | 5/2016 | Baek et al. |
| 2016/0174093 A1 | 6/2016 | Zhou |
| 2016/0219571 A1* | 7/2016 | Lin .................. H04W 74/0833 |
| 2016/0360463 A1* | 12/2016 | Kim .................... H04B 7/0617 |
| 2017/0034730 A1 | 2/2017 | Zhang |
| 2017/0230869 A1 | 8/2017 | Kubota |
| 2017/0295508 A1 | 10/2017 | Stirling-Gallacher |
| 2017/0311276 A1* | 10/2017 | Tsai .................... H04W 48/16 |
| 2018/0041936 A1* | 2/2018 | Kim ..................... H04L 5/0053 |
| 2018/0083722 A1 | 3/2018 | Reial et al. |
| 2018/0123675 A1 | 5/2018 | Shi |
| 2018/0167883 A1* | 6/2018 | Guo .................... H04W 72/046 |
| 2019/0173533 A1* | 6/2019 | Kim ..................... H04W 76/27 |
| 2019/0327650 A1 | 10/2019 | Yiu |
| 2020/0053738 A1 | 2/2020 | Harada |
| 2020/0053788 A1 | 2/2020 | Wang |
| 2020/0136708 A1* | 4/2020 | Pan ....................... H04L 5/0051 |
| 2020/0145079 A1* | 5/2020 | Marinier ............. H04B 7/0456 |
| 2020/0154375 A1* | 5/2020 | Wang ................. H04W 52/242 |
| 2020/0169340 A1* | 5/2020 | Hwang ................ H04W 48/16 |
| 2020/0374960 A1* | 11/2020 | Deenoo ................ H04W 72/14 |
| 2021/0127424 A1* | 4/2021 | Yasukawa ........... H04W 56/001 |

OTHER PUBLICATIONS

Catt, Camping and RACH in Idle/Inactive state, R2-1700224, 3GPP TSG-RAN WG2 NR Ad Hoc Spokane, USA, Jan. 17-19, 2017, 4 pages.
Ericsson, Beamforming impact on random access, R2-1704099, 3GPP TSG-RAN WG2, #98 Hangzhou, P.R. of China, May 15-19, 2017, 4 pages.
Ericsson, Beamforming impact on Random Access (and initial access), R2-1708585, 3GPP TSG-RAN WG2, #99 Berlin, Germany, Aug. 21-25, 2017, 6 pages.
Huawei, UE Measurement in IDLE/INACTIVE state, R2-1704895, 3GPP TSG-RAN WG2 Meeting, #98 Hangzhou, China, May 15-19, 2017, 2 pages.
ISR and Written Opinion from corresponding application PCT/IB2018/056109.
ISR and Written Opinion from related application PCT/IB2018/052301.
Ericsson, Higher layer implications of beamforming during random access, Tdoc R2-1707279, 3GPP TSG-RAN WG2 Ad Hoc on NR, Qingdao, P.R. of China, Jun. 27-29, 2017, 4 pages.

\* cited by examiner

configuring the UE with a channel quality threshold and instructions governing whether to perform additional or full intra-cell measurements including measurements on Synchronization Signal Block beams prior to accessing the cell, the instructions comprising:
accessing the cell using a beam selected for camping when a measured downlink channel quality of the beam selected for camping is equal to or above the channel quality threshold; and
performing the additional or full intra-cell measurement when the measured downlink channel quality of the beam selected for camping is below the downlink channel quality threshold, selecting a beam for accessing the cell based on the additional or full intra-cell beam measurements, and accessing the cell using the beam selected for accessing the cell.
301

Figure 3

ENERGY EFFICIENT CAMPING WITH OPTIMAL BEAM FINDING BEFORE ACCESS

PRIORITY STATEMENT UNDER 35 U.S.C. S.119(E) & 37 C.F.R. 5.1.78

This non-provisional patent application claims priority based upon the prior U.S. provisional patent application entitled "ENERGY EFFICIENT CAMPING WITH OPTIMAL BEAM FINDING BEFORE ACCESS", application No. 62/546,082, filed Aug. 16, 2017, in the names of RUNE et al.

TECHNICAL FIELD

The present disclosure relates to radio access network, camping and beam finding.

BACKGROUND

In Long-Term Evolution (LTE), a User Equipment (UE) in Radio Resource Control (RRC) RRC_IDLE state shall measure the Reference Signal Received Power (RSRP) and Reference Signal Received Quality (RSRQ) level of the serving cell and evaluate the cell selection criterion for the serving cell at least every Discontinuous Reception (DRX) cycle. If the cell selection criterion is fulfilled, the cell is considered as a suitable cell for camping. Otherwise, the UE will search for (and select if available) another suitable cell to camp on. The UE shall also measure and evaluate the non-serving cells with the same methods of cell quality derivation and cell selection criterion as that in the intra-cell measurement and evaluation. The process where the UE switches from camping on one cell to camping on another cell is known as cell re-selection.

In New Radio (NR), a Synchronization Signal (SS) block consists of at least two time-division multiplexed SS components: Primary Synchronization Signal (PSS) and Secondary Synchronization Signal (SSS). The PSS in NR is also referred to as the NR-PSS, but for convenience the term PSS is used in this document. The SSS in NR is also referred to as the NR-SSS, but for convenience the term SSS is used in this document. SSS is used for downlink based Radio Resource Management (RRM) measurement for Layer 3 mobility in RRC_IDLE and RRC_INACTIVE mode.

The SS Block typically also contain a broadcast channel denoted Physical Broadcast Channel (PBCH), which is transmitted together with the PSS and SSS. The PBCH in NR is also referred to as the NR-PBCH, but for convenience the term PBCH is used in this document. The PBCH carries a small part of the system information, sometimes referred to as the Master Information Block (MIB). The PSS+SSS+PBCH structure is denoted SS Block.

The SS Block is broadcast in a cell to provide crucial information for UEs, e.g. UEs in RRC_IDLE or RRC_INACTIVE state. For a given frequency band, an SS block corresponds to N Orthogonal Frequency Division Multiplexing (OFDM) symbols based on the default subcarrier spacing, where N is a constant. A UE shall be able to identify at least OFDM symbol index and slot index in a radio frame and radio frame number from an SS block. A single set of possible SS block time locations (e.g., with respect to radio frame or with respect to SS Burst Set—defined below) is specified per frequency band. At least for multi-beam cases, at least the time index of the SS Block is indicated to the UE. The position(s) of actual transmitted SS Blocks can be informed to facilitate measurements performed by UEs in RRC_CONNECTED, RRC_IDLE or RRC_INACTIVE state.

Referring to FIG. 1a, SS Block transmissions may be grouped into a SS Burst. The SS Block transmissions in a SS Burst may e.g. be the SS Block transmissions of a beam sweep, in the case where transmission of multiple beamformed SS Block transmissions (each covering a different part of the cell coverage area) are used to reach and cover the entire cell coverage area. Although of less interest in the context of the present disclosure, another alternative is that the SS Block transmissions in a SS Burst use wide, e.g. sector-wide or even omnidirectional, beams and the UE can soft-combine the SS Block transmissions to accumulate energy to improve the detection, decoding or reception possibilities. In this case, each SS Block transmission, in principle, covers the entire cell coverage area, but the signal power reaching a UE at the cell edge is not expected to be high enough to enable correct decoding of the SS Block unless the UE soft-combines multiple such SS Block transmissions.

Furthermore, multiple SS Bursts may be grouped in a SS Burst Set. This may e.g. be done in the case when the maximum allowed—or the maximum desired—number of SS Block transmissions in a single SS Burst is not enough to form a complete beam sweep covering the entire cell area. Then, as one example of SS Burst Set usage, the SS Block beams of a complete beam sweep may be divided into multiple SS Bursts forming a SS Burst Set.

Turning to FIG. 1b, a SS Burst Set containing 64 beams is illustrated for two different deployment cases: 120 kHz and 240 kHz subcarrier spacing (SCS). The parameter L is the maximum number of beams for the carrier frequency. In the illustrated case, L is 64 and all 64 beams are utilized in the example. A slot is an entity containing 14 OFDM symbols. The length of an OFDM symbol and a slot in time depends on the subcarrier spacing (the greater the SCS, the shorter the time is for an OFDM symbol and a slot respectively).

The maximum number of SS Blocks, L, within an SS Burst Set may be carrier frequency dependent, e.g.:
  for frequency range up to 3 GHz, L is 4;
  for frequency range from 3 GHz to 6 GHz, L is 8;
  for frequency range from 6 GHz to 52.6 GHz, L is 64.

From the physical layer specification perspective, at least one periodicity of SS Burst Set is supported. From the UE perspective, SS Burst Set transmission is periodic. At least for initial cell selection, a UE may assume a default periodicity of SS Burst Set transmissions for a given carrier frequency (e.g., one of 5 ms, 10 ms, 20 ms, 40 ms, 80 ms, or 160 ms). The UE may assume that a given SS block is repeated with an SS Burst Set periodicity. By default, the UE may neither assume that the gNB transmits the same number of physical beam(s), nor the same physical beam(s) across different SS Blocks within an SS Burst Set. gNB stands for a 5G/NR radio base station.

For each carrier, the SS Burst Sets may be time-aligned or overlap fully or at least in part, or the beginning of the SS Burst Sets may be time-aligned (e.g., when the actual number of transmitted SS Blocks is different in different cells).

From the way the SS Block is transmitted, the UE can also derive a time (or beam) index, so that the SS Block transmission allows the UE to determine System Frame Number (SFN), subframe number and symbol number, as well as symbol border (and thus also subframe border and frame border) synchronization.

In addition to the downlink beam sweeping of SS Block transmissions, a UE which uses analog receiver beamforming may only be capable of listening for downlink transmissions in one direction at a time. Consequently, such a UE may have to perform receiver beam sweeping in order to identify a receiver beam which can be used to receive the desired signal. To identify a working, or optimal, downlink transmission and receiver beam pair, such a UE may have to try each of its receiver beams (or each of a set of receiver beams) for each downlink transmission beam.

From an RRC_IDLE or RRC_INACTIVE UE perspective in the cell re-selection procedure, a camping UE typically needs to periodically perform beam measurement and evaluation of the serving cell, namely intra-cell measurement and evaluation. The UE also has to periodically perform beam measurement and evaluation on both the serving cell and non-serving cells, namely inter-cell measurement and evaluation. According to the 3GPP agreement, the cell quality for the cell re-selection is derived from up to N best beams with a quality above a configurable absolute threshold, where the value of N can be configured to 1 or more than 1. This method to derive the cell quality could be used for the intra-cell and inter-cell quality measurement for the cell re-selection.

The intra-cell measurement on multiple beams in NR is more demanding, e.g. in terms of energy consumption, for a camping UE (i.e. a UE in RRC_IDLE or RRC_INACTIVE state located in the cell) than measuring on a single full-cell-covering wide or omnidirectional transmission as in LTE.

SUMMARY

Certain aspects of the present disclosure and their embodiments may provide solutions to these or other challenges.

To avoid the above described situation, a UE may use a strategy whereby it saves energy during camping by applying limited intra-cell measurements, but when the need to access the cell arises (e.g. due to Uplink (UL) data arriving in the UL buffer or due to a received paging message), the UE first performs additional intra-cell measurement (measuring on more SS Block beams in the cell) to be sure to find a good beam before initiating the access procedure (e.g. the random access procedure). A UE may advantageously apply the strategy selectively, e.g. depending on a trade-off between higher initial bitrate and increased access delay.

There is provided a method, executed in a User Equipment, UE, for energy efficient beam selection and re-selection for camping on a cell and for accessing the cell. The method comprises performing partial intra-cell beam measurements; selecting a beam for camping on the cell based on the partial intra-cell beam measurements; detecting a need to access the cell; and upon determining not to perform additional intra-cell beam measurements for assessment of potential beam re-selection, accessing the cell using the beam selected for camping on the cell; or upon determining to perform additional intra-cell beam measurements for assessment of potential beam re-selection, performing additional intra-cell beam measurements, selecting a beam for accessing the cell based on the additional intra-cell beam measurements, and accessing the cell using the beam selected for accessing the cell.

Prior to all steps, the method may comprise performing initial beam measurements, and selecting a serving cell. Performing initial beam measurements may comprise performing inter-cell measurements. Performing partial intra-cell beam measurements may comprise obtaining a configuration for making a gradual evaluation of a group of beams; gradually evaluating the beams of the group, by evaluating a criterion after each measured beam; and aborting the evaluation when the criterion is met for a beam. Performing partial intra-cell measurements further may comprise periodically performing full intra-cell beam measurements; or performing full intra-cell beam measurements upon detecting a change in the radio environment. Detecting the need to access the cell may be triggered by: an application needing to access the cell, Uplink (UL) data arriving in the UL buffer; detecting a broadcast identifier indicating that the UE needs to inform the network of its location; or receiving a paging message. Determining not to perform or to perform additional intra-cell beam measurements for assessment of potential beam re-selection may be based on at least one of: access delay requirements of an application in the UE; bitrate requirements of the application in the UE; a category or type of the UE; and expected increase of an access delay due to additional intra-cell beam measurements performed prior to accessing the serving cell. Determining not to perform or to perform additional intra-cell beam measurements for assessment of potential beam re-selection may be based on comparing a downlink channel quality measured by the UE on the beam selected for camping with a downlink channel quality threshold received from a network node. Performing additional intra-cell beam measurements comprises performing full intra-cell measurements and the measurements may be performed on all Synchronization Signal Block beams.

There is provided a User Equipment, UE, for energy efficient beam selection and re-selection for camping on a cell and for accessing the cell. The UE comprises processing circuitry and a memory, the memory containing instructions executable by the processing circuitry whereby the UE is operative to: perform partial intra-cell beam measurements; select a beam for camping on the cell based on the partial intra-cell beam measurements; detect a need to access the cell; and upon determining not to perform additional intra-cell beam measurements for assessment of potential beam re-selection, access the cell using the beam selected for camping on the cell; or upon determining to perform additional intra-cell beam measurements for assessment of potential beam re-selection, perform additional intra-cell beam measurements, select a beam for accessing the cell based on the additional intra-cell beam measurements, and access the cell using the beam selected for accessing the cell. The UE may further be operative to perform any one of the steps of the method described herein.

There is provided a method, executed in a network node serving a UE, the UE camping on a cell of the network node and performing partial intra-cell beam measurements for energy efficient beam selection and re-selection for camping on the cell and for accessing the cell. The method comprises configuring the UE with a channel quality threshold and instructions governing whether to perform additional or full intra-cell measurements including measurements on Synchronization Signal Block beams prior to accessing the cell, the instructions comprising: accessing the cell using a beam selected for camping when a measured downlink channel quality of the beam selected for camping is equal to or above the channel quality threshold; and performing the additional or full intra-cell measurement when the measured downlink channel quality of the beam selected for camping is below the downlink channel quality threshold, selecting a beam for accessing the cell based on the additional or full intra-cell beam measurements, and accessing the cell using the beam selected for accessing the cell.

The network node may transmit the channel quality threshold and the instructions to the UE as system information using dedicated signalling. The network node may be a 5G/NR NodeB, gNB.

There is provided a network node, serving a UE, the UE camping on a cell of the network node and performing partial intra-cell beam measurements for energy efficient beam selection and re-selection for camping on the cell and for accessing the cell. The network node comprises processing circuitry and a memory, the memory containing instructions executable by the processing circuitry whereby the network node is operative to: configure the UE with a channel quality threshold and instructions governing whether to perform additional or full intra-cell measurements including measurements on Synchronization Signal Block beams prior to accessing the cell, the instructions comprising: accessing the cell using a beam selected for camping when a measured downlink channel quality of the beam selected for camping is equal to or above the channel quality threshold; and performing additional or full intra-cell measurement when the measured downlink channel quality of the beam selected for camping is below the downlink channel quality threshold, selecting a beam for accessing the cell based on the additional or full intra-cell beam measurements, and accessing the cell using the beam selected for accessing the cell.

The network node may be further operative to transmit the channel quality threshold and the instructions to the UE as system information using dedicated signalling. The network node may be a 5G/NR NodeB, gNB.

There is provided a non-transitory computer readable media having stored thereon instructions for energy efficient beam selection and re-selection for camping on the cell and for accessing the cell, the instructions comprising any one of the steps of the methods described herein.

BRIEF DESCRIPTION OF THE DRAWINGS

FIG. 3 is a flowchart of a method in accordance with some embodiments.

DETAILED DESCRIPTION

Figure 1A:
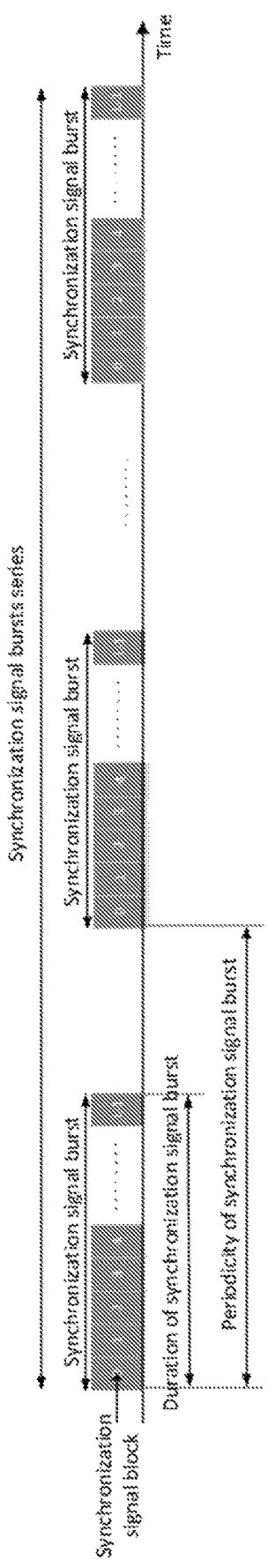
FIG. 1a is a schematic illustration of an example configuration of SS Blocks, SS Burst and SS Burst Set.
Figure 1B:
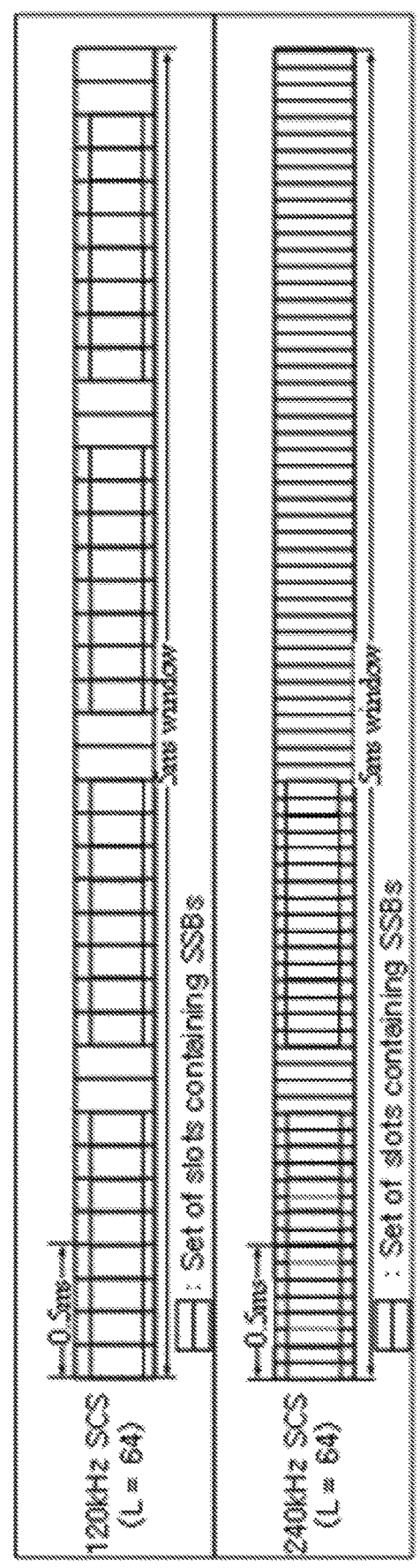
FIG. 1b is a schematic illustration of a SS Burst Set containing 64 beams.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Because the intra-cell measurement on multiple beams in NR is more demanding, than measuring on a single full-cell-covering wide or omnidirectional transmission as in LTE, means allowing a UE to limit its intra-cell measurements in NR are desirable. In one alternative, the UE is configured with a condition for interrupting an intra-cell measurement event. For instance, when the UE has measured an SS Block transmission, i.e. a beam, (or a group of beams) which meets the configured condition (e.g. in terms of RSRP), the UE determines that the cell is still good enough to remain camping on (e.g. it fulfils the suitability condition) and interrupts the intra-cell measurement event (i.e. the UE does not measure on any more beams in the cell during this measurement event). The UE can, during subsequent measurements for assessment of the camping cell's continued suitability (i.e. subsequent intra-cell measurement events), open its receive/measurement window only around the duration of the beam (or set of beams if the suitability condition is expressed in terms of multiple beams) that has previously fulfilled the suitability condition.

A disadvantage of using the kind of limited intra-cell measurements during camping in RRC_IDLE or RRC_INACTIVE state, as described previously, is that the UE may be camping on a beam (or set of beams) which is actually not the best in the cell. This in turn means that when actually accessing the cell, the UE will have a suboptimal initial beam configuration and will thus receive a lower level of service (e.g. lower bitrate) than it would receive with the best beam in the cell.

Beam refinement will eventually optimize the beam configuration (e.g. select the best beam), but beam refinement typically works by sending reference signals in directions close to the current beam and let the receiver (e.g. the UE for downlink beam refinement) measure on these reference signals and report the result to the sender (e.g. the gNB). Further, the beam refinement process may "get stuck" at a suboptimal beam, due to a local optimum (i.e. that the beam quality gets worse when nearby directions are tried, which causes the beam refinement procedure to stay with the current beam configuration (which may be seen as a local optimum in the "beam direction space"), when there is actually a better beam in another, possibly entirely different, direction, which may still reach the receiver (e.g. the UE) with good quality via reflection or refraction.

Moreover, even if the beam refinement process works as intended (i.e. it does not get stuck at a suboptimal beam), if the communication event involves only an amount of data which is comparatively small in relation to the high bitrates of NR (which still may be a significant data amount in relation to ordinary communication events), the communication event may be over before the beam refinement process has converged. If this happens frequently, the radio resources of the NR cell will be systematically underutilized with consistently suboptimal resource efficiency as a result.

The expression "accessing the cell using the beam" or similar is used in this document, where "the beam" refers to the downlink beam the UE has selected for reception of the SS Block. The way this downlink beam is relevant for the UE's network access is that each SS Block beam (or group of SS Block beams) is associated with certain uplink transmission resources configured for transmission of random access signals known as random access preambles. Such a transmission indicates a UE's request to access the network and also initiates a procedure whereby the UE acquires uplink synchronization. The uplink transmission resources on which a random access preamble arrives, and potentially the chosen random access preamble itself, thus indicate to the network which downlink beam the UE has selected and which downlink beam the network therefore can use for communication with the UE, e.g. for transmission of the random access response message.

To avoid some of the problems described previously, a UE may use a strategy whereby it saves energy during camping by applying limited intra-cell measurements. But when the need to access the cell arises (e.g. due to UL data arriving in the UL buffer or due to a received paging message), the UE first performs additional or full intra-cell measurements (trying to measure on more or on all SS Block beams in the cell by openings its receiver window at least to the whole duration of an SS Burst Set or equivalent signal(s) e.g. a Channel State Information Reference Signal (CSI-RS) configured for the same procedure) to be sure to find a good beam or the best beam before initiating the access procedure (e.g. the random access procedure).

As this strategy (whereby the UE saves energy during camping by applying limited intra-cell measurements) is likely to increase the delay until the random access procedure can be initiated (depending on the density of Physical Random Access Channel (PRACH) resources in the time domain compared to the time needed for a full intra-cell measurement), the strategy may be applied selectively. For instance, if low access delay is more important than having high initial bitrate, then the UE may choose to immediately access the cell and use the beam it is currently camping on without first checking whether there is a better beam in the cell. (An alternative in this case is also that the UE does not use limited intra-cell measurement and accepts the consequence in terms of higher energy consumption.) On the other hand, if high bitrate is important, while short access delay is not critical, the UE should use the proposed strategy to find a good beam or the best beam before accessing the cell. Note also that the potentially increased access delay incurred by the proposed strategy may be (fully or partly) regained after some time (and some communicated data), if a significantly better beam is found this way, where significantly higher bitrates can be achieved.

A UE could alternatively select whether to use the strategy (whereby the UE saves energy during camping by applying limited intra-cell measurements and whereby the UE performs additional or full intra-cell measurements when UL data arrives in the UL buffer or due to a received paging message) on a case per case basis, i.e. depending on the cause of the need for accessing the cell. It is also conceivable that some UEs, e.g. UEs (typically) running applications requiring high bitrate (e.g. indicated by the type/category of the UE), always use the strategy, while other UEs, e.g. UEs running applications requiring very short access latency (e.g. Ultra-Reliable Low Latency Communication (URLLC) applications, (e.g. indicated by the type/category of the UE) never use the strategy. Such selection criteria can also be determined by the network, via broadcast (e.g. the system information) or dedicated mode configuration.

Another circumstance that may impact a UE's decision of whether to use the strategy (whereby the UE saves energy during camping by applying limited intra-cell measurements and whereby the UE performs additional or full intra-cell measurements when UL data arrives in the UL buffer or due to a received paging message) is the expected delay caused by performing a complete measurement on all beams to find the best beam in the cell. This in turn depends on the number of beams in the cell, the time required for a complete beam sweep (i.e. where the SS Block is transmitted in each of the SS Block beams in the cell, one after the other), the period with which beam sweeps are repeated (e.g. the SS Burst Set repetition period), the time until the next beam sweep (e.g. SS Burst Set) will begin and (if the UE uses analog Receive/Reception (RX) beamforming) the number of receiver UE beams to sweep per downlink Transmit/Transmission (TX) beam. Accordingly, a UE may take the expected additional delay into account such that if a too long additional delay is expected, the UE may choose to skip the strategy of finding a better beam or the optimal beam and instead go for the current camping beam and access the cell immediately. The search for an optimal beam involves selecting a downlink TX beam from network and possibly also a RX beam in the UE. The identified good or optimal RX beam in the UE may implicitly also indicate the UL TX beam the UE should use to send the PRACH preamble (e.g. based on directional reciprocity of the RX beam generating a good or the best beam link pair on TX/RX).

The expected additional delay, the cause of the need to access (e.g. requirements of an application wanting to communicate) and the current quality of the current camping beam (from which the expected level of service may be estimated) may all be used in a trade-off algorithm to decide whether or not to use the strategy.

Yet another possibility is that the UE applies the strategy (whereby the UE saves energy during camping by applying limited intra-cell measurements and whereby the UE performs additional or full intra-cell measurements when UL data arrives in the UL buffer or due to a received paging message) partially. For instance, if the UE can tolerate some additional access delay, but not as much additional delay as a full beam sweep measurement would cause, the UE may measure on some additional beams—hoping to find a better beam than its current camping beam—but abort this procedure at the time required, to be able to access the cell without too much additional latency. The UE would then use the best beam it has found (which may be the camping beam or another beam).

A UE could also mix limited and full beam searches (i.e. measuring on the complete downlink beam sweep), e.g. using limited beam searches most of the time, but a full beam search once in a while (i.e. not only upon a network access trigger). For instance, full beam searches could be applied periodically or when the UE detects a (significant) change of the radio environment, (e.g. a change of the channel quality of the downlink beam it is currently receiving the SS Block transmissions in).

In addition to the above described UE autonomous methods for selecting whether to apply the proposed strategy, it would be possible to provide network control, such that the network (e.g. the gNB) configures the UE with instructions governing whether to apply the strategy (whereby the UE saves energy during camping by applying limited intra-cell measurements). An example of such instructions could be a downlink channel quality threshold level, wherein the UE is instructed to apply the strategy if the downlink channel quality of the beam the UE currently camps on is lower than the threshold level, but omit the full intra-cell measurement and rely on the currently perceived best beam (i.e. the camping beam) for accessing the cell if the downlink channel quality of the beam the UE currently camps on is higher than (or equal to) the threshold level.

Another example could be simply "apply" or "don't apply" the strategy. The instructions could be included in the cell's system information. As previously mentioned, the network could also configure the UE with criteria for when to apply the strategy, e.g. based on which application that triggers the need for network access or which type of application the UE is typically running Such configuration could be performed via the system information or using UE-specific dedicated signalling when the UE is in RRC_CONNECTED state. The configuration information could e.g. be included in a message switching the UE from RRC_CONNECTED to RRC_INACTIVE or RRC_IDLE state.

Figure 2:
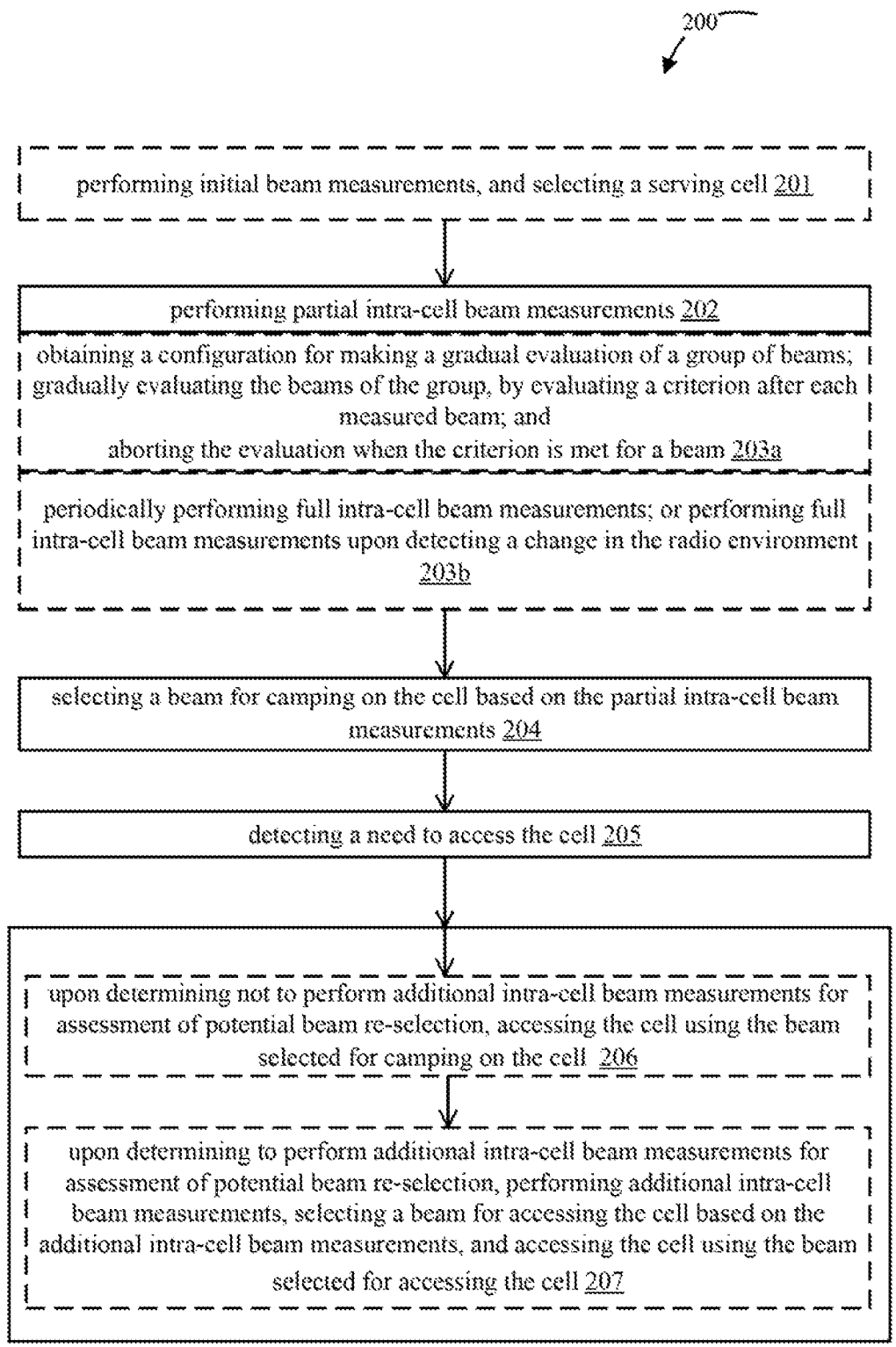
FIG. 2 is a flowchart of a method in accordance with some embodiments.

Referring to FIG. 2, there is provided a method 200, executed in a User Equipment, UE, for energy efficient beam selection and re-selection for camping on a cell and for accessing the cell. The method comprises performing, step 202, partial intra-cell beam measurements; selecting, step 204, a beam for camping on the cell based on the partial intra-cell beam measurements; detecting, step 205, a need to access the cell; and upon determining not to perform additional intra-cell beam measurements for assessment of potential beam re-selection, accessing, step 206, the cell using the beam selected for camping on the cell; or upon determining to perform additional intra-cell beam measurements for assessment of potential beam re-selection, performing, step 207, additional intra-cell beam measurements, selecting a beam for accessing the cell based on the additional intra-cell beam measurements, and accessing the cell using the beam selected for accessing the cell.

Prior to all steps, the method may comprise performing, step 201, initial beam measurements and evaluation, and selecting a serving cell. Performing initial beam measurements and evaluation may comprise performing inter-cell measurements. Performing partial intra-cell beam measurements may comprise obtaining, step 203a, a configuration for making a gradual evaluation of a group of beams; gradually evaluating the beams of the group, by evaluating a criterion after each measured beam; and aborting the evaluation when the criterion is met for a beam. Performing partial intra-cell measurements further may comprise performing, extended partial intra-cell measurements on additional beams when additional access delay can be tolerated; periodically performing, step 203b, full intra-cell beam measurements; or performing full intra-cell beam measurements upon detecting a change in the radio environment. Detecting the need to access the cell may be triggered by: an application needing to access the cell, Uplink (UL) data arriving in the UL buffer; detecting a broadcast identifier indicating that the UE needs to inform the network of its location (e.g. detecting a Tracking Area Identity indicating a Tracking Area which is not included in the UE's configured list of Tracking Areas); or receiving a paging message. Determining not to perform or to perform additional intra-cell beam measurements for assessment of potential beam re-selection may be based on at least one of: access delay requirements of an application in the UE; bitrate requirements of the application in the UE; a category or type of the UE; and expected increase of an access delay due to additional intra-cell beam measurements performed prior to accessing the serving cell. Determining not to perform or to perform additional intra-cell beam measurements for assessment of potential beam re-selection may be based on comparing a downlink channel quality measured by the UE on the beam selected for camping (i.e. the beam the UE is currently camping on) with a downlink channel quality threshold received from a network node (and/or a downlink channel quality threshold specified in a standard specification). Performing additional intra-cell beam measurements may comprise performing full intra-cell measurements and the measurements may be performed on all Synchronization Signal Block beams.

Turning to FIG. 3, there is provided a method, 300, executed in a network node serving a UE, the UE camping on a cell of the network node and performing partial intra-cell beam measurements for energy efficient beam selection and re-selection for camping on the cell and for accessing the cell. The method comprises configuring, step 301, the UE with a channel quality threshold and instructions governing whether to perform additional or full intra-cell measurements including measurements on Synchronization Signal Block beams prior to accessing the cell, the instructions comprising: accessing the cell using a beam selected for camping when a measured downlink channel quality of the beam selected for camping is equal to or above the channel quality threshold; and performing the additional or full intra-cell measurement when the measured downlink channel quality of the beam selected for camping is below the downlink channel quality threshold, selecting a beam for accessing the cell based on the additional or full intra-cell beam measurements, and accessing the cell using the beam selected for accessing the cell.

The network node may transmit the channel quality threshold and the instructions to the UE as system information using dedicated signalling. The network node may be a 5G/NR Evolved Universal Terrestrial Radio Access Network NodeB, gNB (i.e. a 5G/NR radio base station).

There is provided a non-transitory computer readable media having stored thereon instructions for energy efficient beam selection and re-selection for camping on the cell and for accessing the cell, the instructions comprising any one of the steps of the methods described herein.

Figure 4A:
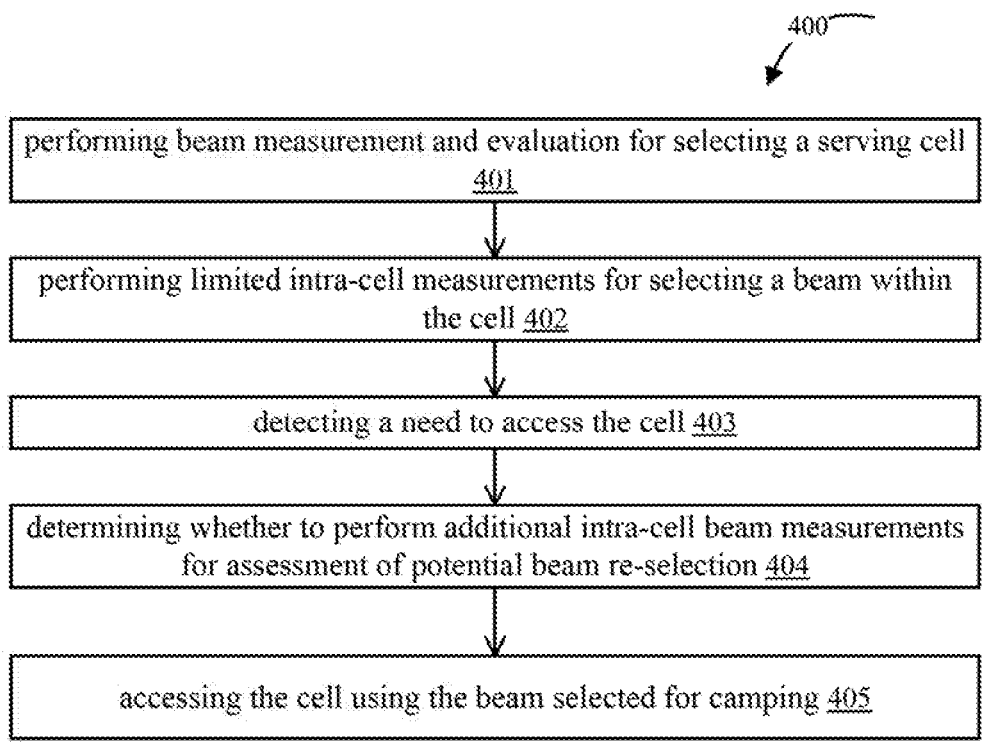
FIGS. 4a and 4b are flowcharts of methods in accordance with some embodiments.

Referring to FIG. 4a, alternatively, there is provided a method 400 in a UE for energy efficient camping and beam selection, comprising the steps of: performing, step 401, beam measurement and evaluation for selecting a serving cell; performing, step 402, limited intra-cell measurements for selecting a beam within the cell; detecting, step 403, a need to access the cell; determining, step 404, whether to perform additional intra-cell beam measurements for assessment of potential beam re-selection; and accessing, step 405, the cell using the beam selected for camping. Performing beam measurements and evaluation for selecting a serving cell may comprise performing inter-cell measurements.

Performing limited intra-cell measurements for selecting a beam within the cell may comprise: obtaining a configuration for making a gradual evaluation of a group of beams; gradually evaluating the beams of the group, by evaluating a criterion after each measured beam; and aborting the measurements when the criterion is met for a beam, according to the configuration.

Performing limited intra-cell measurements for selecting a beam within the cell may comprise: obtaining a rule for beam selection; gradually evaluating a plurality of beams and applying the rule for each beam; and aborting the measurements when the rule is satisfied for a beam.

Performing limited intra-cell measurements may comprise any one or more of: performing limited intra-cell measurements; performing full intra-cell measurements; and performing extended, partial intra-cell measurements.

The need to access the cell may be determined based on any one of: an application triggering a need to access the cell; uplink (UL) data arriving in the UL transmission buffer; detecting a broadcast identifier indicating that the UE needs to inform the network of its location (e.g. detecting a Tracking Area Identity indicating a Tracking Area which is not included in the UE's configured list of Tracking Areas), or receiving a paging message.

Determining whether to perform beam re-selection may be based on at least one of: a type of application triggering the need to access the cell; requirements of the application triggering the need to access the cell; access delay requirement of an application in the UE; bitrate requirement of an application in the UE; category or type of the UE; and expected increase of an access delay due to full intra-cell measurements performed prior to accessing the serving cell.

Determining whether to perform beam re-selection may further comprise any one of: performing full intra-cell measurements; relying on the currently selected beam (i.e. the beam the UE is camping on); and performing extended, partial intra-cell measurements.

Performing full intra-cell measurements may comprise performing measurements on all Synchronization Signal Block beams.

The UE may perform receiver beam sweeping, trying a set of receiver beams for each downlink beam that is used for the signal(s) the UE measures on.

The method may further comprise the step of camping on the selected beam.

Alternatively or complementarily, there is provided a method in a UE for camping on a cell where beam sweeping is applied to the downlink signal(s) the UE measures on to select and re-select cell to camp on, wherein the method enables energy efficient camping combined with optimal beam (or Tx/Rx beam pair) selection for accessing the cell, the method comprising the steps of: applying limited intra-cell measurements, detecting a need to access the cell, determining whether to perform a full intra-cell measurement (comprising measurements on all SS Block beams) prior to accessing the cell, and accessing the cell.

Determining whether to perform a full intra-cell measurement may be based on at least one of: access delay requirement of an application in the UE, bitrate requirement of an application in the UE, category or type of the UE, and expected increase of the access delay due to a full intra-cell measurement performed prior to accessing the cell.

Determining whether to perform a full intra-cell measurement may result in the UE performing one of the following additional steps: performing a full intra-cell measurement prior to accessing the cell, relying on the beam currently perceived as the best for accessing the cell, and performing an extended, but still partial intra-cell measurement prior to accessing the cell.

Applying limited intra-cell measurements may involve mixing of: performing limited intra-cell measurements, performing full intra-cell measurements, and/or performing an extended, but still partial intra-cell measurements.

The UE may apply receiver beam sweeping, trying a set of receiver beams for each downlink beam that is used for the signal(s) the UE measures on.

Figure 4B:
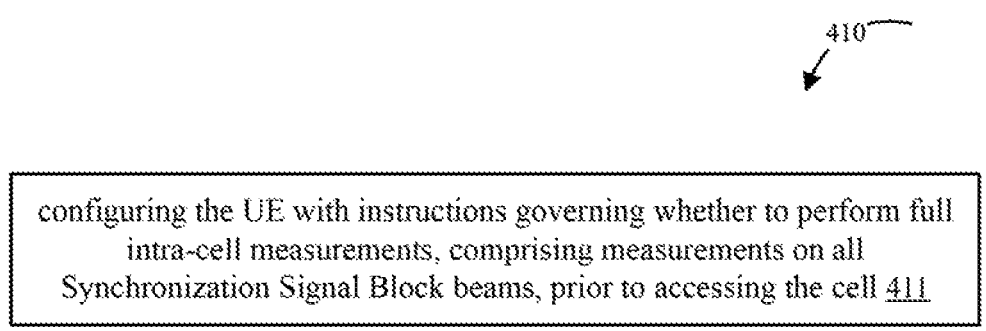

Turning to FIG. 4b, alternatively, there is also provided a method 410 in a network node serving a UE camping on a cell of the network node, the method comprising the step of: configuring, step 411, the UE with instructions governing whether to perform full intra-cell measurements, comprising measurements on all Synchronization Signal Block beams, prior to accessing the cell. The configuring step may comprise transmitting the instructions to the UE as system information or as dedicated signaling.

The instructions may comprise conditional instructions including a downlink channel quality threshold level to be used for comparing the downlink channel quality measured by the UE on a beam selected for camping, the instructions further comprising instructions to: perform a full intra-cell measurement comprising measurements on all Synchronization Signal Block beams when the measured downlink channel quality is below the threshold level, and rely on the beam currently perceived as the best (i.e. the beam the UE is camping on) for accessing the cell when the measured downlink channel quality is equal to or above the threshold level.

The instructions may comprise conditional instructions including criteria defining when to perform a full intra-cell measurement, wherein the criteria comprise any one of: an application triggering a need to access the cell; a type of application triggering the need to access the cell; and requirements of the application triggering the need to access the cell. The network node may be a gNB.

Alternatively or complementarily, there is provided a method in a network node serving a UE camping with limited intra-cell measurements on a cell of the network node where beam sweeping is applied to the downlink signal(s) used for measurements for selection and re-selection of camping cell, wherein the method enables energy efficient camping for the UE combined with optimal beam selection when accessing the cell, the method comprising the step of configuring the UE with instructions governing whether to perform a full intra-cell measurement (comprising measurements on all SS Block beams) prior to accessing the cell.

Configuring the UE with instructions governing whether to perform a full intra-cell measurement may comprise transmitting the instructions to the UE as system information or as dedicated signaling. The instructions may either be conditional or unconditional [where unconditional may be either "apply" or "don't apply"].

The conditional instructions may comprises a downlink channel quality threshold level to be compared with the downlink channel quality measured by the UE on the beam it currently perceives as the best (i.e. the beam the UE is camping on) when the UE determines to access the cell, accompanied by the instruction to the UE to: if the measured downlink channel quality is below the threshold level, perform a full intra-cell measurement (comprising measurements on all SS Block beams) prior to accessing the cell, and if the measured downlink channel quality is equal to or above the threshold level, rely on the beam currently perceived as the best (i.e. the beam the UE is camping on) for accessing the cell.

The conditional instructions may comprise criteria for when to perform a full intra-cell measurement, where the criteria are based on any of: the application triggering the need to access the cell [e.g. identified by the application identity an app can receive from App Store™ or Google Play™] the type of application triggering the need to access the cell, and the requirements of the application triggering the need to access the cell. The network node may be a gNB.

Certain embodiments may provide one or more of the following technical advantage(s). According to some embodiments, a UE in RRC_IDLE or RRC_INACTIVE state will be enabled to camp energy-efficiently on a cell, in accordance with some proposed limited intra-cell measurement principles, while still achieving optimal service from the start, when switching to RRC_CONNECTED state in the cell.

Figure 5:
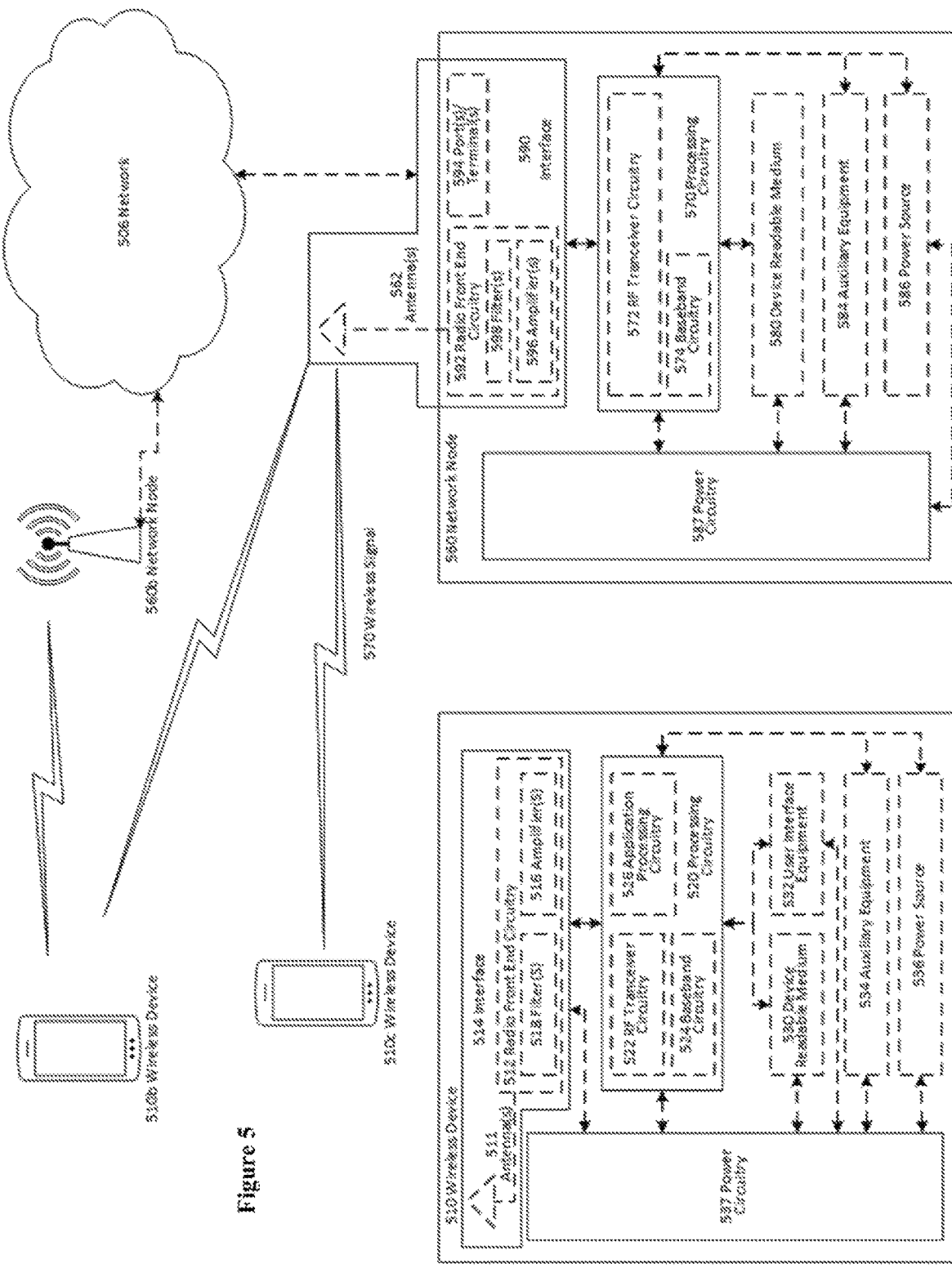
FIG. 5 is a schematic illustration of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and wireless devices (WDs) 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations such as obtaining operations, described herein as being provided by a network node. These operations performed by processing circuitry 570 may include processing information.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units.

In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

There is provided a network node, 560, serving a UE, the UE camping on a cell of the network node and performing partial intra-cell beam measurements for energy efficient beam selection and re-selection for camping on the cell and for accessing the cell. The network node 560 comprises processing circuitry 570 and a memory 580, the memory containing instructions executable by the processing circuitry whereby the network node is operative to: configure the UE with a channel quality threshold and instructions governing whether to perform additional or full intra-cell measurements including measurements on Synchronization Signal Block beams prior to accessing the cell, the instructions comprising: accessing the cell using a beam selected for camping when a measured downlink channel quality of the beam selected for camping is equal to or above the channel quality threshold; and performing the additional or full intra-cell measurement when the measured downlink channel quality of the beam selected for camping is below the downlink channel quality threshold, selecting a beam for accessing the cell based on the additional or full intra-cell beam measurements, and accessing the cell using the beam selected for accessing the cell. The network node may be further operative to transmit the channel quality threshold and the instructions to the UE as system information using dedicated signalling. The network node may be a 5G/NR NodeB, gNB.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations such as obtaining operations described herein as being performed by a WD. These operations, as performed by processing circuitry 520, may include processing information obtained by processing circuitry 520.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
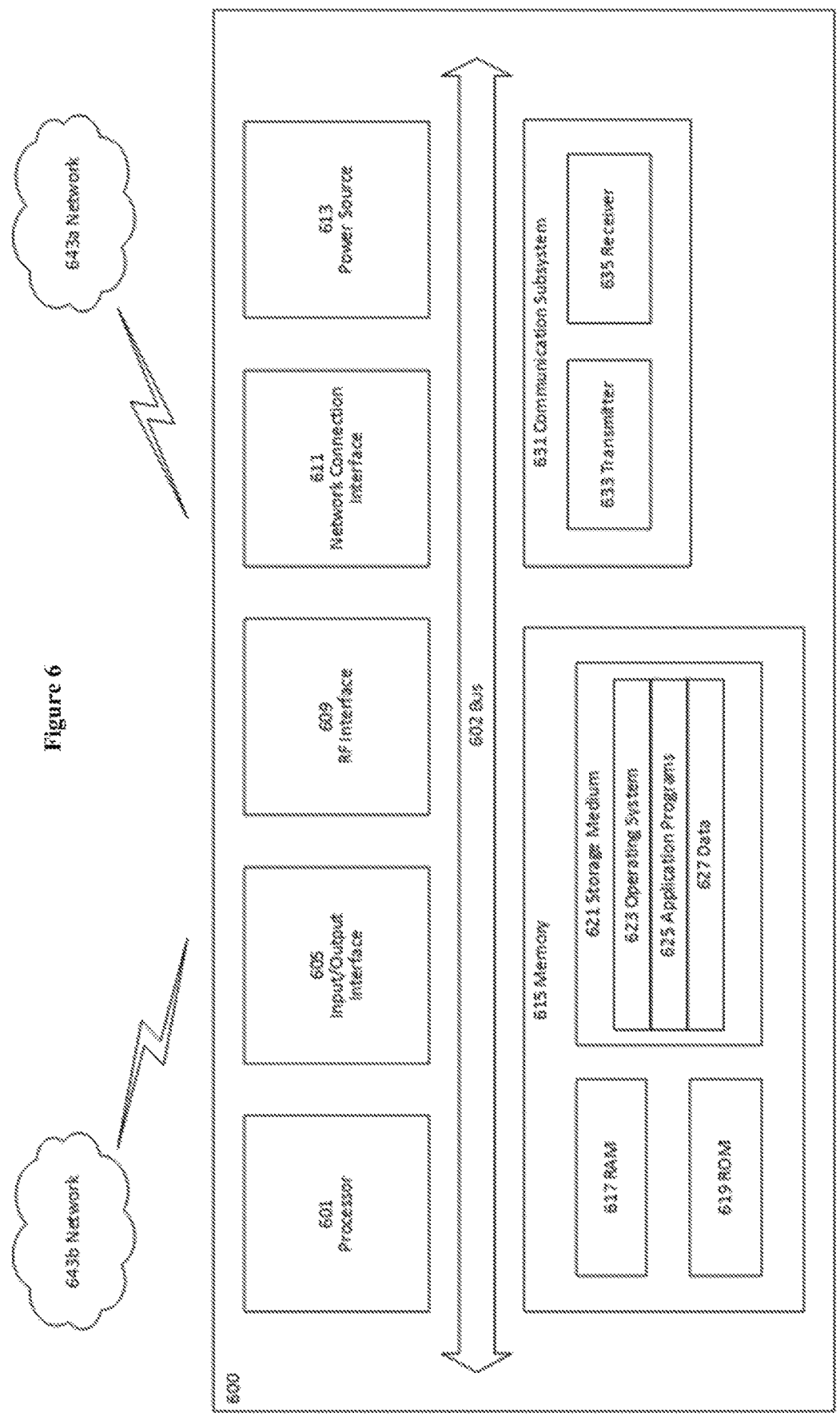
FIG. 6 is a schematic illustration of a User Equipment in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the $3^{rd}$ Generation Partnership Project (3GPP), including a NB-IoT UE that is not intended for sale to, or operation by, a human user. UE 600, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.6, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

There is provided a User Equipment, UE 600, for energy efficient beam selection and re-selection for camping on a cell and for accessing the cell. The UE comprises processing circuitry 601 and a memory 615, the memory containing instructions 625 executable by the processing circuitry whereby the UE 600 is operative to: perform partial intra-cell beam measurements; select a beam for camping on the cell based on the partial intra-cell beam measurements; detect a need to access the cell; and upon determining not to perform additional intra-cell beam measurements for assessment of potential beam re-selection, access the cell using the beam selected for camping on the cell; or upon determining to perform additional intra-cell beam measurements for assessment of potential beam re-selection, perform additional intra-cell beam measurements, select a beam for accessing the cell based on the additional intra-cell beam measurements, and access the cell using the beam selected for accessing the cell. The UE may further be operative to perform any one of the steps of the method described herein.

Figure 7:
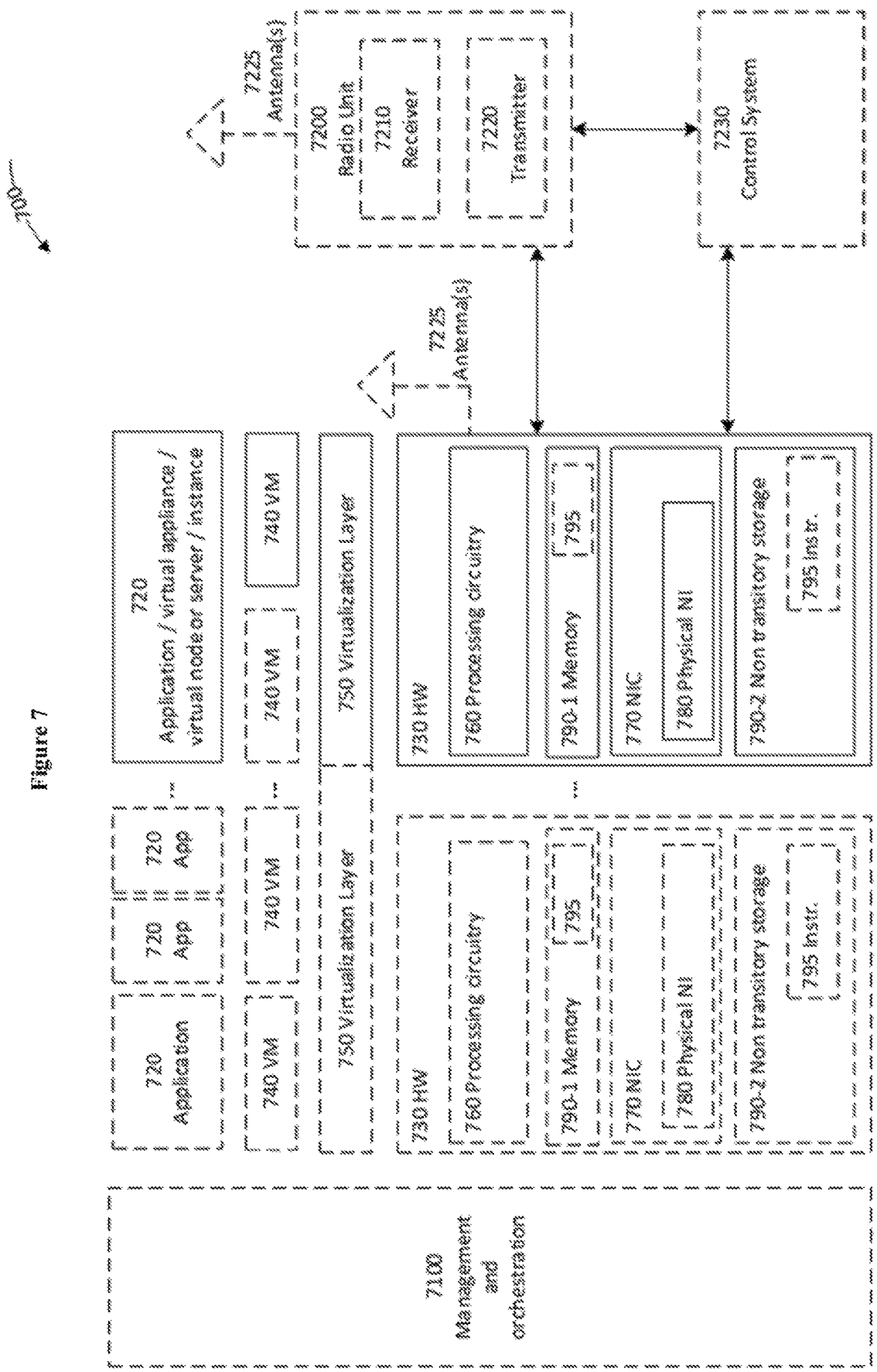
FIG. 7 is a schematic illustration of a virtualization environment in accordance with some embodiments.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
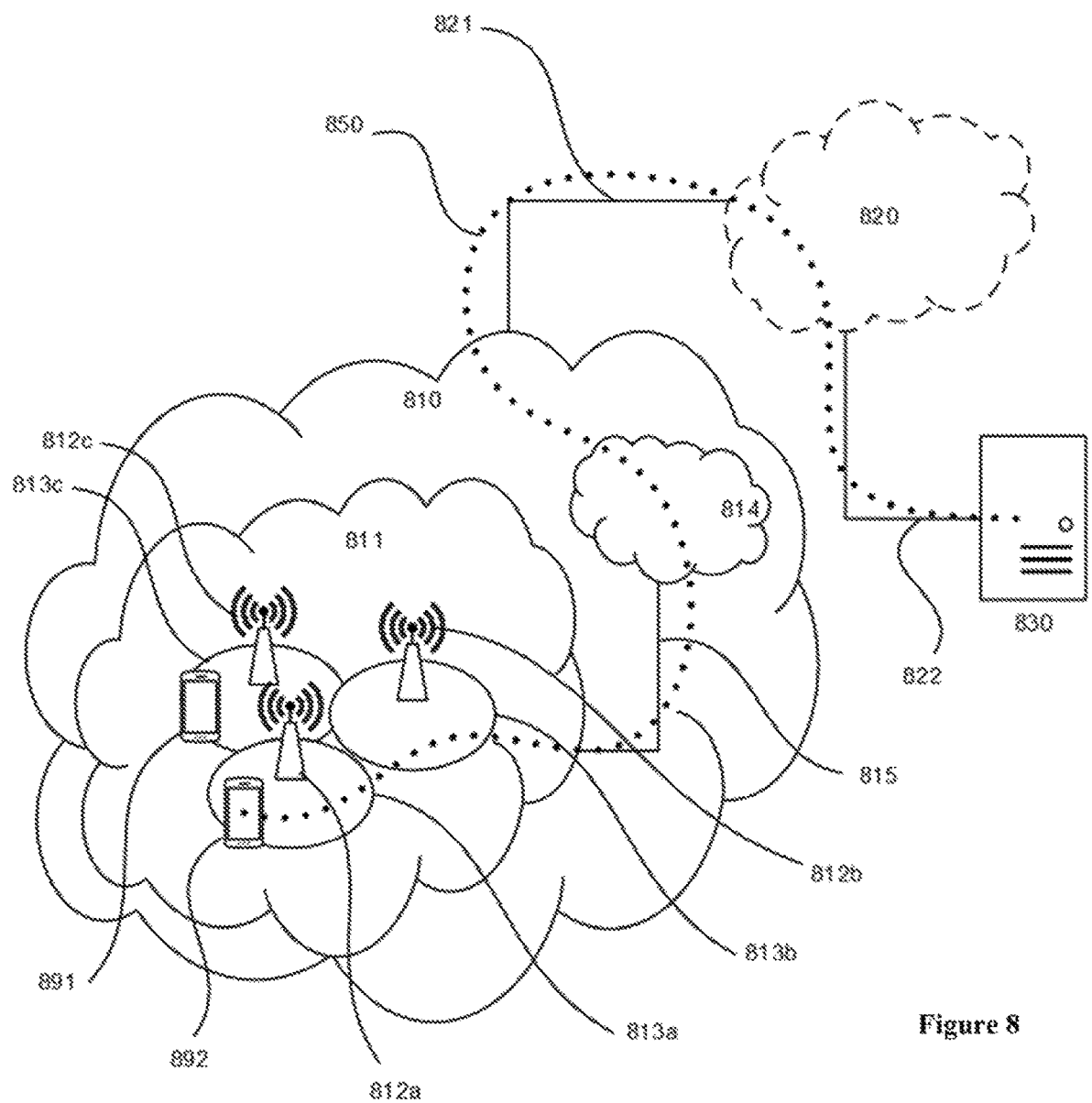
FIG. 8 is a schematic illustration of a telecommunication network connected via an intermediate network to a host computer in accordance with some embodiments.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
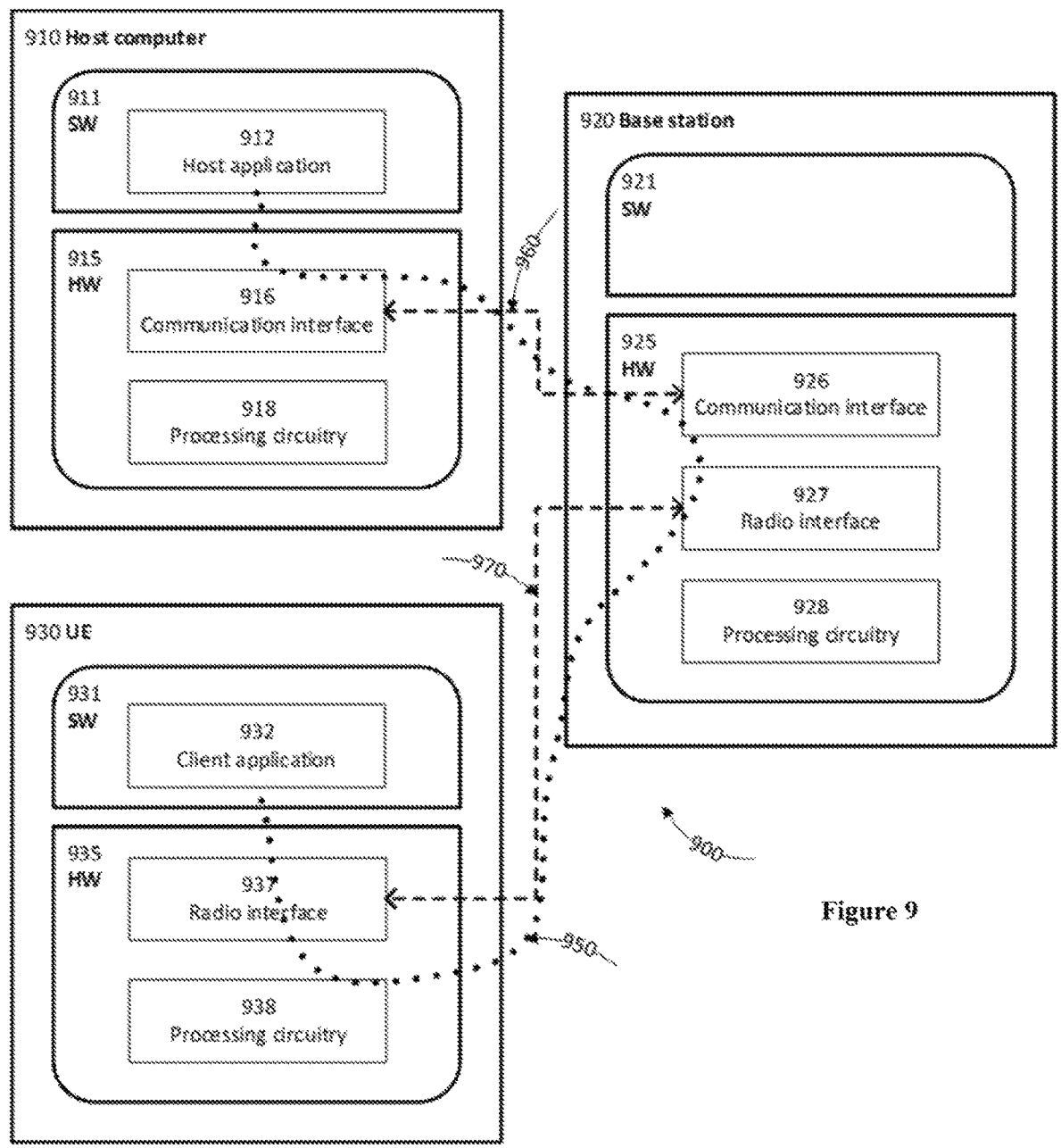
FIG. 9 is a schematic illustration of a host computer communicating via a base station with a user equipment over partially wireless connection in accordance with some embodiments.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the power consumption of the UE and thereby provide benefits such as extended battery lifetime.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
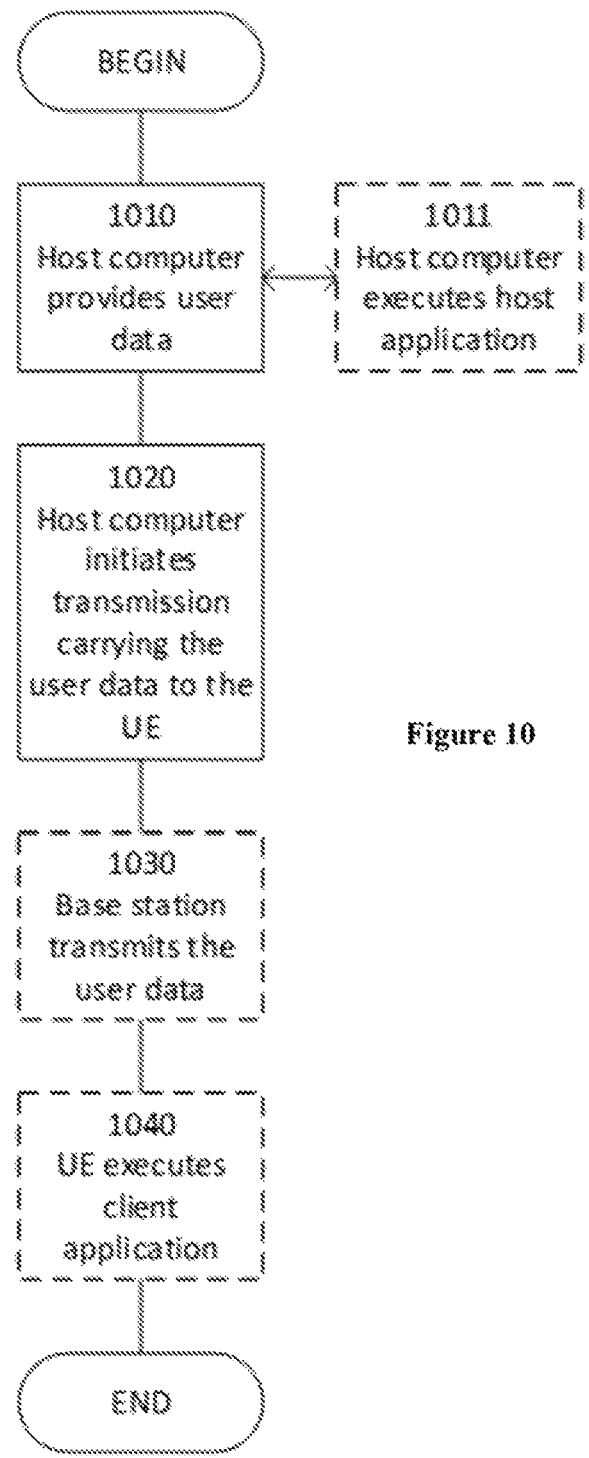
FIG. 10 is a flowchart of a method implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
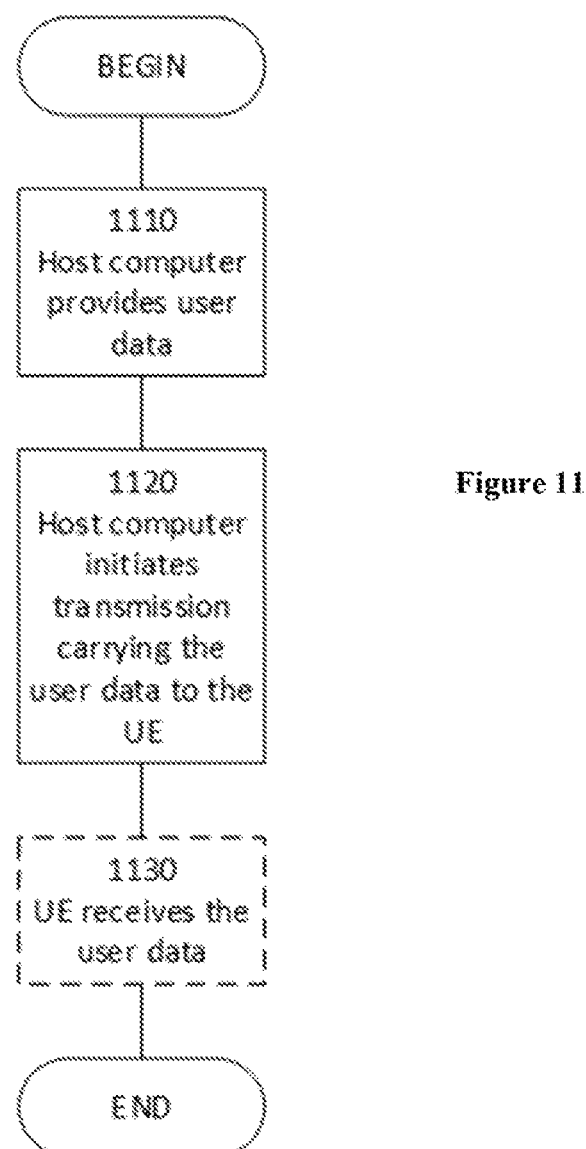
FIG. 11 is a flowchart of a method implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method, executed in a User Equipment, UE, for energy efficient beam selection and re-selection for camping on a cell and for accessing the cell, comprising:
    performing initial beam measurements, and selecting a serving cell;
    performing partial intra-cell beam measurements;
    selecting a beam for camping on the cell based on the partial intra-cell beam measurements;
    detecting a need to access the cell; and
        upon determining not to perform additional intra-cell beam measurements for assessment of potential beam re-selection, accessing the cell using the beam selected for camping on the cell; or
        upon determining to perform additional intra-cell beam measurements for assessment of potential beam re-selection, performing additional intra-cell beam measurements, selecting a beam for accessing the cell based on the additional intra-cell beam measurements, and accessing the cell using the beam selected for accessing the cell;
    wherein determining not to perform or to perform additional intra-cell beam measurements for assessment of potential beam re-selection is based on at least one of:
        access delay requirements of an application in the UE;
        bitrate requirements of the application in the UE;
        a category or type of the UE; and
        expected increase of an access delay due to additional intra-cell beam measurements performed prior to accessing the serving cell.

2. The method of claim 1, wherein performing initial beam measurements comprises performing inter-cell measurements.

3. The method of claim 1, wherein performing partial intra-cell beam measurements comprises:
    obtaining a configuration for making a gradual evaluation of a group of beams;
    gradually evaluating the beams of the group, by evaluating a criterion after each measured beam; and
    aborting the evaluation when the criterion is met for a beam.

4. The method of claim 1, wherein performing partial intra-cell measurements further comprises:
    periodically performing full intra-cell beam measurements; or
    performing full intra-cell beam measurements upon detecting a change in the radio environment.

5. The method of claim 1, wherein detecting the need to access the cell is triggered by: an application needing to access the cell, Uplink (UL) data arriving in the UL buffer;

detecting a broadcast identifier indicating that the UE needs to inform the network of its location; or receiving a paging message.

6. The method of claim 1, wherein determining not to perform or to perform additional intra-cell beam measurements for assessment of potential beam re-selection is based on comparing a downlink channel quality measured by the UE on the beam selected for camping with a downlink channel quality threshold received from a network node.

7. The method of claim 1, wherein performing additional intra-cell beam measurements comprises performing full intra-cell measurements and wherein the measurements are performed on all Synchronization Signal Block beams.

8. A User Equipment, UE, for energy efficient beam selection and re-selection for camping on a cell and for accessing the cell, the UE comprising processing circuitry and a memory, the memory containing instructions executable by the processing circuitry whereby the UE is operative to:
   perform initial beam measurements, and select a serving cell;
   perform partial intra-cell beam measurements;
   select a beam for camping on the cell based on the partial intra-cell beam measurements;
   detect a need to access the cell; and
      upon determining not to perform additional intra-cell beam measurements for assessment of potential beam re-selection, access the cell using the beam selected for camping on the cell; or
      upon determining to perform additional intra-cell beam measurements for assessment of potential beam re-selection, perform additional intra-cell beam measurements, select a beam for accessing the cell based on the additional intra-cell beam measurements, and access the cell using the beam selected for accessing the cell;
   wherein determining not to perform or to perform additional intra-cell beam measurements for assessment of potential beam re-selection is based on at least one of:
      access delay requirements of an application in the UE;
      bitrate requirements of the application in the UE;
      a category or type of the UE; and
      expected increase of an access delay due to additional intra-cell beam measurements performed prior to accessing the serving cell.

9. The UE of claim 8, further operative to:
   obtain a configuration for making a gradual evaluation of a group of beams;
   gradually evaluate the beams of the group, by evaluating a criterion after each measured beam; and
   abort the evaluation when the criterion is met for a beam.

10. The UE of claim 8, further operative, when performing partial intra-cell measurements, to:
   periodically perform full intra-cell beam measurements; or
   perform full intra-cell beam measurements upon detecting a change in the radio environment.

* * * * *